(12) United States Patent
Gadkaree et al.

(10) Patent No.: US 7,781,361 B2
(45) Date of Patent: Aug. 24, 2010

(54) METHOD FOR REGENERATION OF ACTIVATED CARBON CATALYST BEDS

(75) Inventors: Kishor Purushottam Gadkaree, Big Flats, NY (US); Youchun Shi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 838 days.

(21) Appl. No.: 11/433,187

(22) Filed: May 11, 2006

(65) Prior Publication Data

US 2007/0264179 A1 Nov. 15, 2007

(51) Int. Cl.
*B01J 38/04* (2006.01)

(52) U.S. Cl. .............................. 502/34; 502/56; 502/514

(58) Field of Classification Search .................. 502/25, 502/26, 27, 34, 38, 54, 56, 514
See application file for complete search history.

(56) References Cited

U.S. PATENT DOCUMENTS

| | | | |
|---|---|---|---|
| 4,701,212 A | 10/1987 | Yan | |
| 5,232,882 A * | 8/1993 | Yoshimoto et al. | 502/5 |
| 5,451,444 A | 9/1995 | DeLiso et al. | 3/12 |
| 5,460,643 A | 10/1995 | Hasenpusch et al. | |
| 5,487,917 A | 1/1996 | Gadkaree | 3/2 |
| 5,488,023 A | 1/1996 | Gadkaree et al. | 21/18 |
| 5,565,077 A * | 10/1996 | Gold et al. | 204/666 |
| 5,597,617 A | 1/1997 | DeLiso et al. | 3/2 |
| 5,607,496 A | 3/1997 | Brooks | |
| 5,628,819 A | 5/1997 | Mestemaker et al. | |
| 5,658,372 A | 8/1997 | Gadkaree | 95/116 |
| 5,750,026 A | 5/1998 | Gadkaree et al. | 210/502.1 |
| 5,820,967 A | 10/1998 | Gadkaree | 428/116 |
| 5,820,969 A | 10/1998 | Satoh | 5/66 |
| 5,948,143 A | 9/1999 | Sjostrom et al. | |
| 5,998,328 A | 12/1999 | Dawes et al. | 21/18 |
| 6,024,899 A | 2/2000 | Peng et al. | 31/2 |
| 6,025,292 A | 2/2000 | Obayashi et al. | |
| 6,027,551 A | 2/2000 | Hwang et al. | 53/4 |
| 6,097,011 A | 8/2000 | Gadkaree et al. | 1/2 |
| 6,136,072 A | 10/2000 | Sjostrom et al. | |
| 6,136,749 A | 10/2000 | Gadkaree et al. | 27/2 |
| 6,156,697 A | 12/2000 | Gadkaree | 20/20 |
| 6,187,713 B1 | 2/2001 | Gadkaree | 31/12 |
| 6,228,803 B1 | 5/2001 | Gadkaree et al. | 31/8 |
| 6,248,691 B1 | 6/2001 | Gadkaree et al. | 20/2 |
| 6,251,822 B1 | 6/2001 | Peng et al. | 31/8 |
| 6,258,334 B1 | 7/2001 | Gadkaree et al. | 53/46 |
| 6,372,289 B1 | 4/2002 | Hickman | 3/2 |
| 6,455,023 B1 | 9/2002 | Gadkaree et al. | 5/0 |
| 6,596,661 B2 | 7/2003 | Neufert | |
| 6,869,978 B2 * | 3/2005 | Wright et al. | 518/709 |
| 6,962,617 B2 | 11/2005 | Simpson | |
| 7,214,254 B2 | 5/2007 | Tranquilla | |
| 7,217,401 B2 | 5/2007 | Ramme et al. | |
| 2001/0008617 A1 | 7/2001 | Robles | |
| 2004/0204308 A1 | 10/2004 | Kapila et al. | |
| 2007/0167309 A1 | 7/2007 | Olson | |
| 2007/0221250 A1 | 9/2007 | Schneider et al. | |

FOREIGN PATENT DOCUMENTS

| | | | |
|---|---|---|---|
| EP | 0 761 279 | 3/1997 | 39/20 |
| WO | WO 99/02243 | 1/1999 | 53/4 |

* cited by examiner

*Primary Examiner*—Edward M Johnson
(74) *Attorney, Agent, or Firm*—Joseph M. Homa

(57) ABSTRACT

Disclosed are methods and systems for regenerating mercury loaded activated carbon honeycomb catalyst beds. In one embodiment, the regeneration methods and systems disclosed herein can enable a more efficient and economical operation of a honeycomb based mercury removal system by, for example, allowing the reuse of a particular substrate multiple times.

28 Claims, 3 Drawing Sheets

METHOD FOR REGENERATION OF ACTIVATED CARBON CATALYST BEDS

BACKGROUND OF THE INVENTION

1. Field of the Invention

The present invention relates to activated carbon honeycomb catalyst beds and, more particularly, to methods and systems for regenerating mercury loaded activated carbon honeycomb catalyst beds.

2. Technical Background

Emissions of hazardous materials and/or heavy metals such as Hg, Ni, Cr, Cd, Co, Pb, V, Se, Be, As, Zn, etc. have become environmental issues of increasing importance because of the dangers to human health. Of these metals, mercury is a trace element of particular concern, because during coal and municipal solid waste combustion, most of the mercury present in coal and municipal solid waste is transferred into the vapor phase due to its high volatility. It is also known that mercury can be transformed to a potentially toxic species (methylmercury) under natural conditions found in the environment. Mercury that is emitted to the atmosphere can travel thousands of miles for before being deposited to the earth. Further, studies have also shown that mercury from the atmosphere can be deposited in areas near an emission source.

Coal-fired power plants and medical waste incineration are major sources of human activity related mercury emission to the atmosphere. It is estimated that 48 metric tons of mercury are emitted from coal-fired power plants in the US every year and 1500 metric tons of mercury are emitted from coal-fired power plants worldwide. Currently available pollution abatement technologies are not capable of effectively controlling elemental mercury emissions particularly from flue gas emissions in the utility industry. Once discharged to the atmosphere, mercury persists in the environment and creates long-term contamination problems.

Among current state of the art mercury remediation technologies, adsorption on sulfur-impregnated activated carbon has shown some promise with removal of 50-90% mercury in flue gases depending on reaction conditions. Sulfur is introduced into activated carbon by impregnating with different forms of sulfur such as elemental sulfur, carbon disulfide, hydrogen sulfide, or sulfur dioxide. This honeycomb substrate based technology can significantly reduce the amount of hazardous waste. Additionally, the honeycomb based technology can enable the reuse of fly ash since it is not mixed with the active carbon powder. Still further, fixed bed honeycomb technology does not require an expensive carbon powder collecting system and can be placed at the end of the existing flue gas waste treatment system, which allows retrofitting to the existing treatment system. Thus, the actual cost to the power plant can be reduced further.

Since it is undesirable to utilize a mercury removal system occupying a relatively large space, a fixed bed honeycomb system may require frequent changing or replacement of the honeycomb sorbent in order to maintain adequate mercury removal efficiency. Such frequent replacement can result in an interruption of the system operation and added cost. Accordingly, there is a need in the art for an efficient method of regenerating a mercury loaded honeycomb sorbent catalyst bed.

SUMMARY OF THE INVENTION

The present invention relates to activated carbon honeycomb catalyst beds and, more particularly, to methods and systems for regenerating activated carbon honeycomb catalyst beds having a quantity of mercury loaded thereon. The regeneration methods can enable a more efficient and economical operation of a honeycomb based mercury removal system by allowing reuse of a particular substrate multiple times. Further, the methods of regeneration can also provide for efficient mercury removal utilizing a relatively small space, non-interrupting operation, and/or cost effective automation.

In a first embodiment, the present invention provides a method for regenerating a monolithic activated carbon honeycomb catalyst bed, comprising the steps of: providing an activated carbon honeycomb body having a quantity of mercury loaded on at least a portion of the activated carbon honeycomb; subjecting the quantity of loaded mercury to treatment conditions effective to chemically and/or physically desorb at least a portion of the mercury to provide elemental mercury in a waste stream and separating the waste stream comprising the elemental mercury from the honeycomb body.

In a second embodiment, the present invention further provides a method for regenerating a monolithic activated carbon honeycomb catalyst bed, comprising the steps of: providing an activated carbon honeycomb body having a quantity of mercury loaded on at least a portion of the activated carbon honeycomb body; subjecting the quantity of loaded mercury to treatment conditions effective to electrochemically reduce at least a portion of the mercury to provide elemental mercury; and separating the elemental mercury from the honeycomb body.

Alternatively, according to an embodiment of the present invention, activated honeycombs can be regenerated by removing other flue gas components that are adsorbed during the course of removing mercury without significantly removing loaded mercury on activated carbon honeycombs. These flue gas components are $SO_2$, $CO_2$, $NO_2$ and NO. These components have significantly higher concentrations than the concentration of mercury in a flue gas. Thus, they can occupy the active sites on the activated carbon substrate and block the sorption of mercury. In general, these gases are physically adsorbed. Minor heating between 150° C. to 350° C., more preferably at 180° C. and 280° C., or applying minor resistive heating can remove the physically adsorbed gases and enable more active sites available for mercury sorption. Since these gases are acidic gases, a basic solution such as a solution of sodium hydroxide, sodium carbonate or ammonia can also be used to react with the acidic gases and remove them from occupied active sites for mercury sorption.

Additional embodiments of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the instant invention and together with the description, serve to explain, without limitation, the principles of the invention.

DETAILED DESCRIPTION OF THE INVENTION

Figure 1:
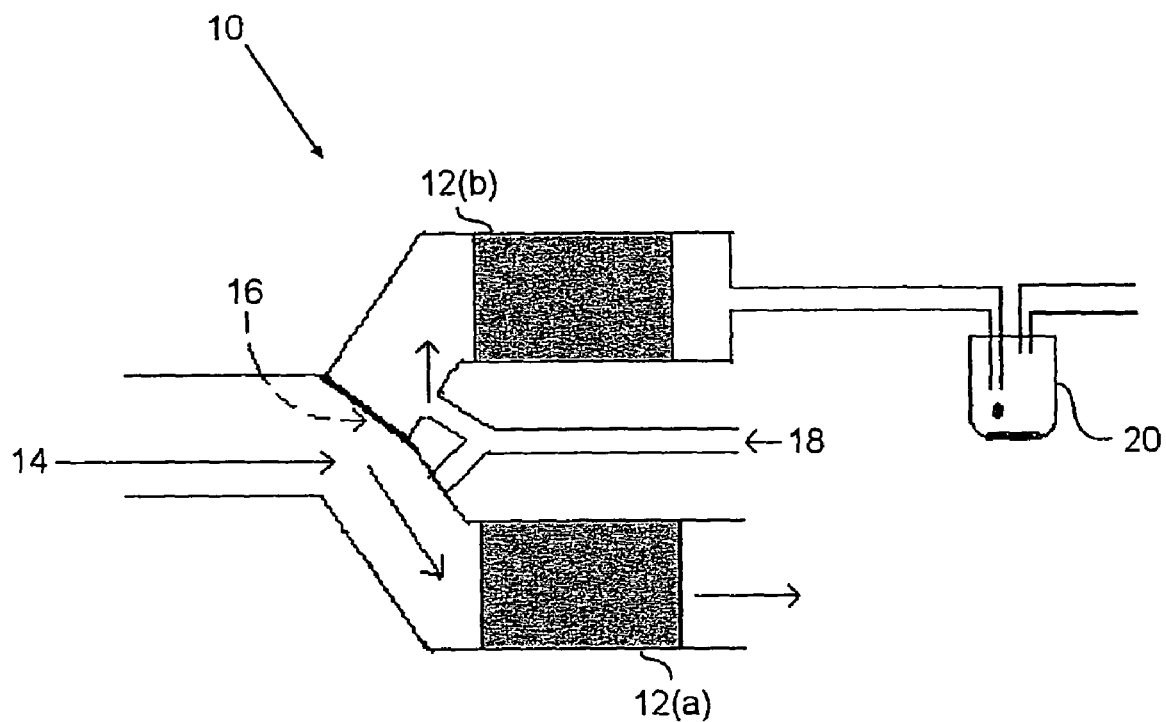
FIG. 1 is a schematic illustration of an exemplary non-interruptive regeneration system having a configuration according to one embodiment of the present invention.

The present invention can be understood more readily by reference to the following detailed description, examples, and claims, and their previous and following description. However, before the present methods and systems are disclosed and described, it is to be understood that this invention is not limited to the specific methods and systems disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "mercury containing compound" includes embodiments having two or more such mercury containing compounds, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, is based on the total weight of the composition in which the component is included.

As briefly summarized above, the present invention provides methods and systems for the regeneration of mercury loaded activated carbon catalyst substrates. These methods and systems can, in one embodiment, enable a more efficient and economical use of the substrates by rendering a previously spent substrate viable for more than one usage. For example, the regeneration methods of the present invention can, in one embodiment, render an activated carbon substrate reusable for as many as 10 to 500 times. These methods can also save the time required for changing or replacing a spent substrate, can reduce the required amount of substrate material, and can reduce the amount of generated waste. Still further, the methods of the present invention can enable more efficient recycling and collection of mercury or mercury containing compounds that becomes loaded onto the activated carbon catalyst substrate.

It should also be understood that the methods and systems of the present invention are not limited to use in connection with any particular substrate but, rather, can be used in connection with any number of substrates known in the art. However, in one embodiment, the methods and systems of the present invention are particularly useful in connection with sulfur containing activated carbon honeycomb substrates such as those disclosed and described in U.S. Pat. No. 6,258,334, the entire disclosure of which is incorporated by reference herein in its entirety for all purposes. As disclosed therein, the activated carbon honeycomb body can also optionally comprise one or more added co-catalyst metals. Exemplary co-catalysts metals can include Pt, Pd, Rh, Ag, Au, Fe, Re, Sn, Nb, V, Zn, Pb, Ge, As, Se, Co, Cr, Ni, Mn, Cu, Li, Mg, Ba Mo, Ru, Os, Ir, or any combination thereof.

The activated carbon honeycomb body having a quantity of mercury loaded on at least a portion thereof can be provided from any known system or process wherein the honeycomb substrate is used for mercury remediation from a waste stream. For example, in one embodiment, the mercury loaded honeycomb body can be provided from a coal fired combustion system wherein the activated carbon honeycomb body was used to remove mercury from a flue gas or other process waste stream. To this end, the loaded mercury can be chemically and or physically bonded to the activated carbon honeycomb substrate. Further, the quantity of loaded mercury can, in one embodiment, comprise elemental mercury that is chemically and or physically loaded on at least a portion of the activated carbon honeycomb substrate. Alternatively, at least a portion of the loaded mercury can be present in a mercury containing compound, such as, for example, mercury sulfide, mercury chloride, elemental mercury, or any combination thereof, that is chemically or physically bound to the honeycomb substrate.

In a first embodiment, the present invention provides a method comprising subjecting a quantity of mercury loaded on an activated carbon honeycomb to thermal treatment conditions effective to chemically and/or physically desorb at least a portion of the mercury from the honeycomb and to provide elemental mercury in a waste stream. The waste stream comprising desorbed mercury can then be separated from the honeycomb body.

Treatment conditions effective to chemically and/or physically desorb at least a portion of the mercury from the honeycomb body can comprise heating the honeycomb body at a temperature sufficient to chemically and/or physically desorb the mercury. It should be appreciated that a sufficient temperature will depend, in part, on variables such as the form in which the mercury is present, i.e., as elemental mercury or a mercury containing compound, and the amount of mercury that is present. However, in one embodiment, a sufficient temperature can comprise heating the honeycomb body at a temperature in the range of from 150° C. to 900° C., including exemplary temperatures of 180° C., 200° C., 250° C., 300° C., 350° C., 400° C., 450° C., 500° C., 550° C., 600° C., 650° C., 700° C., 750° C., 800° C., or even 850° C. In still another embodiment, the sufficient heating temperature can be in any range derived from these values, including for example, a range of from 200° C. to 500° C.

The honeycomb body can be heated by any conventionally known method. For example, in one embodiment the honeycomb body can be heated by a flow of hot inert gas such as nitrogen. Alternatively, the flow of inert gas can comprise one or more flue gases obtained from a combustion system. In another embodiment, the honeycomb body can be heated by passing a sufficient voltage across a portion of the honeycomb body to provide a resulting resistive heating of the honeycomb body. Still further, the honeycomb body can be heated by a conventional furnace or oven.

Once at least a portion of the loaded mercury has been chemically and/or physically desorbed from the activated carbon honeycomb body, the desorbed mercury can be separated from the honeycomb body by a waste stream. In one embodiment, a suitable waste stream for conveying the desorbed mercury can again comprise a flow of inert gas, such as nitrogen. Still further, the waste stream containing at least a portion of the desorbed mercury can, if desired, be conveyed to a mercury collection device for subsequent remediation or collection of the desorbed mercury. For example, in one embodiment, the waste stream can convey the desorbed mercury to a conventional distillation device, such as a cooling coil, to remove and collect mercury (e.g., elemental mercury or oxidized mercury) from the waste stream.

In still another embodiment, the activated carbon honeycombs substrate of the present invention are sufficiently conductive to be used as an electrode in an electrochemical reaction. Therefore, in another embodiment, the present invention provides a method for regenerating a mercury loaded monolithic activated carbon honeycomb catalyst bed loaded with a quantity of mercury wherein the method comprises subjecting at least a portion of the quantity of loaded mercury to electrochemical treatment conditions effective to electrochemically reduce at least a portion of the mercury compound(s), present mainly as mercury sulfide, and to provide elemental mercury in a waste stream. The waste stream containing the resulting elemental mercury can then be separated from the honeycomb body.

Any conventional electrochemical treatment conditions known to one of ordinary skill in the art can be used to reduce at least a portion of the loaded mercury to elemental mercury. However, in one embodiment, the electrochemical treatment conditions can comprise contacting the honeycomb body with a basic solution, such as a solution of sodium hydroxide, sodium carbonate, or ammonia, and simultaneously applying a voltage potential to the activated carbon honeycomb substrate.

One of skill in the art will appreciate that the voltage potential sufficient to electrochemically reduce the loaded mercury to elemental mercury can depend, in part, on the particular composition of the activated carbon honeycomb substrate, the amount and form of the loaded mercury, and the basic solution used. However, in one embodiment, a voltage potential in the range of from −0.60 volts to −1.20 volts can be applied to the activated carbon honeycomb substrate, including exemplary voltages of −0.65, −0.70, −0.75, −0.80, 0.85, −0.90, −0.95, −1.00, −1.05, −1.10, and −1.15. In still another example, the suitable voltage can be in any range derived from these voltage values, including for example, a voltage in the range of from −0.65 to −0.85 volts.

In an exemplary embodiment, at least a portion of the loaded mercury can be present as mercury sulfide which can be reduced to elemental mercury electrochemically in a basic solution. Specifically, the reduction reaction of mercury sulfide occurs based on the following standard electrode potentials:

$$HgS+2e^-=Hg+S^{2-} \ -0.69\,V \quad (1)$$

$$2H_2O+2e^-=H_2+2OH^- \ -0.83\,V \quad (2)$$

$$2H^++2e^-=H_2 \ 0.00\,V \quad (3)$$

A comparison of equation (1) and equation (2) shows that in this exemplary embodiment, mercury sulfide can be reduced to elemental mercury without any evolution of hydrogen by adding voltage between −0.69V and −0.83 V to the substrate in a basic solution. Further, equation (3) indicates that in the presence of an acid solution, the electrochemical reduction reaction would trigger the evolution of hydrogen.

A waste stream can subsequently be used to flush the elemental mercury from the activate carbon honeycomb body. In one embodiment, the waste stream can be an aqueous waste stream. Still further, the waste stream can be treated with an oxidizing agent, such as a chlorine solution, to oxidize the elemental mercury and to provide mercuric ions. The resulting mercuric ions can then be reacted with a precipitating agent, such as sulfide, to precipitate the mercury from the waste stream and to facilitate collection of the mercury.

In still another embodiment, the present invention provides a method whereby at least a portion of the mercury loaded on the activated carbon honeycomb can be reacted with an acid solution under conditions effective to dissolve at least a portion of the mercury sulfide and to provide a waste stream comprising the dissolved mercury. Once again, the waste stream, comprising the dissolved mercury, can further be separated from the honeycomb body.

Any acid suitable for dissolving at least a portion of the loaded mercury can be used according to the instant method. The suitable acid can comprise, for example, a hydrochloric acid, a nitric acid, a combination of hydrochloric and nitric acids, and other acids (especially when used with chelating agent(s)). For example, the hydrochloric acid is capable of reacting with mercury sulfide to provide mercury chloride in an acid solution and sulfide. The resulting mercury can then be removed from the honeycomb body by separating the acid solution containing the dissolved mercury sulfide from the honeycomb body. If desired, the dissolved mercury can then be precipitated from the separated acid solution to facilitate remediation and collection of the mercury.

In still another exemplary embodiment, any one of the above-mentioned methods can be incorporated into a system configuration that enables the non-interruptive and, if desired, even automated regeneration of a honeycomb sorbent without requiring a significant shut down or interruption of a process stream in which the honeycomb sorbent is being used. For example, with reference to FIG. 1, an exemplary system configuration 10 for non-interruptive thermal desorbtion of mercury from an activated carbon honeycomb body is shown. In this exemplary embodiment, a plurality of activated carbon honeycomb monoliths 12 are positioned in selective fluid communication with a continuous stream of mercury containing combustion flue gas 14. A means 16 for selectively directing the continuous stream of flue gas to at least one of the plurality of honeycomb monoliths is also provided, including for example, and without limitation, a baffle or shutter valve. When the valve 16 is positioned in a manner that directs the stream of flue gas toward honeycomb monolith 12(a) in a mercury removal mode, the honeycomb monolith 12(b) is not in fluid communication with the stream of flue gas and thus can be in a regeneration mode and subjected to a method of regeneration as described herein. In the exemplified embodiment, the monolith 12(b) can be thermally regenerated by a stream 18 of hot inert gas, i.e., nitrogen gas. Still further, the stream of inert gas comprising desorbed mercury can be conveyed to a mercury collection device 20, such as a distillation device, to facilitate the separation and collection of the mercury from the stream of inert gas. It will be appreciated that after completion of a regeneration mode, the stream of flue gas can be selectively directed to honeycomb monolith 12(b) such that monolith 12(a) is no longer in fluid communication with the stream of flue gas. Thus, monolith 12(a) can be in a regeneration mode and subjected to a method of regeneration as described herein while honeycomb monolith 12(b) is in a mercury removal mode.

EXAMPLES

To further illustrate the principles of the present invention, the following examples are put forth so as to provide those of ordinary skill in the art with a complete disclosure and description of how the methods claimed herein can be performed and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric.

It should also be understood that while the present invention has been described in detail with respect to certain illustrative and specific embodiments thereof, it should not be considered limited to such, as numerous modifications are possible without departing from the broad spirit and scope of the present invention as defined in the appended claims.

Example 1

Thermal Desorption Regeneration

A comparative mercury sorption breakthrough test was conducted on fresh activated carbon powder and on regenerated carbon powder to illustrate the ability to reuse regenerated activated carbon to remove mercury from a process stream. The regenerated carbon powder sample was obtained by a thermal desorption process as described herein, whereby mercury loaded activated carbon bed was regenerated by subjecting a flow of hot (400° C.) nitrogen gas to the mercury loaded activated carbon bed over a period of approximately two hours.

Figure 2:
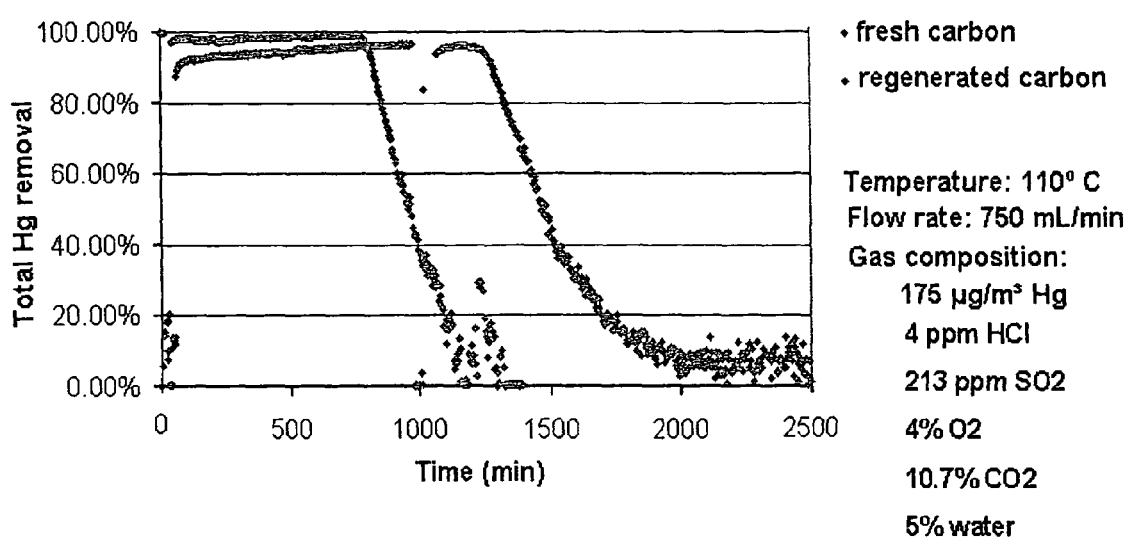
FIG. 2 is a graph illustration of exemplary mercury removal efficiency data for an activated carbon sample regenerated at 400° C. for 2 hours according to one embodiment of the present invention.

In particular, a small amount of activated carbon powder (20 mg) was mixed with 2 g of 150-212 μm glass beads in 6" long glass tubing with inner diameter of 8 mm. An additional 4 inches of 3 mm glass beads was packed in the tubing for use as the gas preheating zone. The packed tubing was placed in an oven and connected to the testing system. The testing was conducted using a testing system with simulated flue gas and PSA Sir Galahad mercury analyzer. In particular, the simulated flue gas comprised 175 μg/m³ Hg, 4 ppm HCl, 213 ppm $SO_2$, 4% $O_2$, 10.7% $CO_2$ and 5% water. Further, the simulated flue gas was provided at a flow rate of 750 ml/min and at temperature of 110° C. After the packed tubing showed the mercury breakthrough or saturation, the tubing was disconnected from the testing system and placed in a tube furnace for regeneration at 400° C. for 2 hours. Then, the tubing was placed in the oven and connected to testing system for the $2^{nd}$ mercury saturation test, conducted using the same testing conditions. The results of the first and second mercury saturation tests are depicted in FIG. 2.

Example 2

Thermal Desorption Regeneration

A second comparative mercury sorption breakthrough test was conducted on fresh activated carbon powder and on regenerated carbon powder. Once again, the regenerated carbon powder sample was obtained by a thermal desorption process as described herein, whereby a mercury loaded activated carbon bed was regenerated by subjecting a flow of hot nitrogen gas (220° C.) to the mercury loaded activated carbon bed over a period of approximately ten hours.

Figure 3:
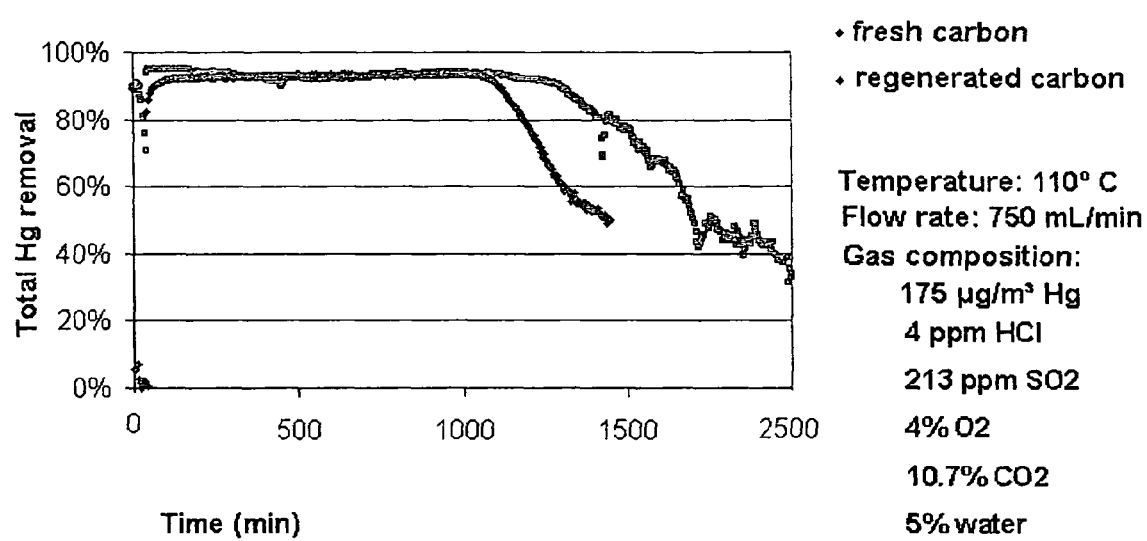
FIG. 3 is a graph illustration of exemplary mercury removal efficiency data for an activated carbon sample regenerated at 220° C. for 10 hours according to one embodiment of the present invention.

In particular, a small amount of activated carbon powder (20 mg) was mixed with 2 g of 150-212 μm glass beads in 6" long glass tubing with inner diameter of 8 mm. An additional 4 inches of 3 mm glass beads was packed in the tubing as the gas preheating zone. The packed tubing was placed in an oven and connected to the testing system. The testing was conducted using a testing system with simulated flue gas and PSA Sir Galahad mercury analyzer. Again, the simulated flue gas comprised 175 μg/m³ Hg, 4 ppm HCl, 213 ppm $SO_2$, 4% $O_2$, 10.7% $CO_2$ and 5% water. Further, the simulated flue gas was provided at a flow rate of 750 ml/min and at temperature of 110° C. After the packed tubing showed the mercury breakthrough or saturation, the tubing was disconnected from the testing system and placed in a tube furnace for regeneration at 220° C. for 10 hours. Then, the tubing was placed in the oven and connected to testing system for the $2^{nd}$ mercury saturation test, conducted again using the same testing conditions. The results of the first and second mercury saturation tests for this example are depicted in FIG. 3.

What is claimed is:

1. A method for regenerating a monolithic activated carbon honeycomb body, comprising the steps of:
    providing an activated carbon honeycomb body having a quantity of mercury loaded on at least a portion of the activated carbon honeycomb;
    subjecting the quantity of loaded mercury to treatment conditions effective to chemically and/or physically desorb at least a portion of the mercury to provide mercury in a waste stream; and
    separating the waste stream comprising the mercury from the honeycomb body.

2. The method of claim 1, wherein the activated carbon honeycomb body comprises infused sulfur.

3. The method of claim 1, wherein the treatment conditions comprise heating the honeycomb body at a temperature in the range of from 150° C. to 900° C.

4. The method of claim 3, wherein the treatment conditions comprise heating the honeycomb body at a temperature in the range of from 250° C. to 500° C.

5. The method of claim 3, wherein the honeycomb body is heated by a flow of hot inert gas.

6. The method of claim 5, wherein the inert gas comprises nitrogen.

7. The method of claim 3, wherein the honeycomb body is heated by passing a voltage across the honeycomb to provide a resistive heating.

8. The method of claim 3, wherein the honeycomb body is heated by a furnace or oven.

9. The method of claim 1, wherein the separating step comprises conveying at least a portion of the mercury to a mercury collection device and collecting at least a portion of the mercury conveyed to the mercury collection device.

10. The method of claim 9, wherein the mercury is conveyed to the mercury collection device by a flow of inert gas.

11. The method of claim 10, wherein the inert gas comprises nitrogen.

12. The method of claim 1, wherein at least a portion of the quantity of loaded mercury is present in a mercury containing compound.

13. The method of claim 12, wherein the mercury containing compound comprises mercury sulfide.

14. A method for regenerating a monolithic activated carbon honeycomb body, comprising the steps of:
   providing an activated carbon honeycomb body having a quantity of mercury loaded on at least a portion of the activated carbon honeycomb body;
   subjecting the quantity of loaded mercury to treatment conditions effective to electrochemically reduce at least a portion of the mercury to provide elemental mercury; and
   separating the elemental mercury from the honeycomb body.

15. The method of claim 14, wherein the honeycomb body comprises infused sulfur.

16. The method of claim 14, wherein at least a portion of the quantity of mercury is present in a mercury containing compound.

17. The method of claim 16, wherein the mercury containing compound comprises mercury sulfide.

18. The method of claim 14, wherein the treatment conditions comprise contacting the honeycomb body with a basic solution and applying a voltage to the honeycomb body in the range of from $-0.60$ volts to $-1.2$ volts.

19. The method of claim 18, wherein the treatment conditions comprise contacting the honeycomb body with a basic solution and applying a voltage to the honeycomb body in the range of from $-0.65$ volts to $-0.85$ volts.

20. The method of claim 14, wherein the separating step comprises conveying mercury from the honeycomb body in a waste stream.

21. The method of claim 20, wherein the waste stream is an aqueous stream.

22. The method of claim 21, further comprising treating the aqueous waste stream comprising mercury with an oxidizing agent to provide mercuric ions and precipitating at least a portion of the mercuric ions with a precipitating agent.

23. A method for regenerating a monolithic activated carbon honeycomb body, comprising the steps of:
   providing an activated carbon honeycomb body having a quantity of mercury loaded on at least a portion of the activated carbon honeycomb body;
   reacting at least a portion of the loaded mercury with an acid solution under conditions effective to dissolve at least a portion of the loaded mercury and to provide a waste stream comprising the dissolved mercury; and
   separating the waste stream comprising dissolved mercury from the honeycomb body.

24. The method of claim 23, wherein the honeycomb body further comprises infused sulfur.

25. The method of claim 23, wherein at least a portion of the quantity of loaded mercury is present in a mercury containing compound.

26. The method of claim 25, wherein the mercury containing compound comprises mercury sulfide.

27. The method of claim 23, wherein the acid comprises hydrochloric acid.

28. The method of claim 23, further comprising precipitating mercuric ions from the separated waste stream comprising the dissolved mercury.

* * * * *